United States Patent
Tsai et al.

(10) Patent No.: US 11,327,564 B2
(45) Date of Patent: May 10, 2022

(54) HEAD MOUNTED DISPLAY APPARATUS AND EYE-TRACKING APPARATUS THEREOF

(71) Applicant: HTC Corporation, Taoyuan (TW)

(72) Inventors: Meng-Che Tsai, Taoyuan (TW);
Kuei-Chun Liu, Taoyuan (TW);
Ching-Chia Chou, Taoyuan (TW);
Sheng-Le Wang, Taoyuan (TW);
Chung-Hsiang Chang, Taoyuan (TW)

(73) Assignee: HTC Corporation, Taoyuan (TW)

(*) Notice: Subject to any disclaimer, the term of this patent is extended or adjusted under 35 U.S.C. 154(b) by 57 days.

(21) Appl. No.: 16/996,895

(22) Filed: Aug. 19, 2020

(65) Prior Publication Data
US 2022/0057860 A1    Feb. 24, 2022

(51) Int. Cl.
| G09G 5/00 | (2006.01) |
| G06F 3/01 | (2006.01) |
| G06F 3/14 | (2006.01) |
| G06T 7/73 | (2017.01) |
| G02B 13/24 | (2006.01) |
| G02B 27/14 | (2006.01) |
| H04N 5/225 | (2006.01) |

(52) U.S. Cl.
CPC .............. *G06F 3/013* (2013.01); *G02B 13/24* (2013.01); *G02B 27/14* (2013.01); *G06F 3/14* (2013.01); *G06T 7/74* (2017.01); *H04N 5/2256* (2013.01); *G06T 2207/30201* (2013.01); *G06T 2207/30204* (2013.01)

(58) Field of Classification Search
CPC ........................................................ G06F 3/013
See application file for complete search history.

(56) References Cited

U.S. PATENT DOCUMENTS

| 2015/0035744 A1* | 2/2015 | Robbins ............. G02B 27/0172 345/156 |
| 2017/0262054 A1* | 9/2017 | Lanman .................. G06F 1/163 |
| 2018/0143449 A1* | 5/2018 | Popovich ............. G02B 5/1828 |

FOREIGN PATENT DOCUMENTS

| CN | 105531716 | 4/2016 |
| CN | 110780442 | 2/2020 |

OTHER PUBLICATIONS

"Office Action of Taiwan Counterpart Application", dated Apr. 6, 2021, pp. 1-6.

* cited by examiner

*Primary Examiner* — Nan-Ying Yang
(74) *Attorney, Agent, or Firm* — JCIPRNET

(57) ABSTRACT

An eye-tracking apparatus includes a first lens group, a light splitting device, a display, an image sensor, a second lens group, and a plurality of light sources. The light splitting device receives a first beam, generates a second beam, and transmits the second beam to a second surface of the first lens group. The display projects a reference mark to a target area through the light splitting device and the first lens group. The image sensor captures a detection image on the target area through the first lens group, the light splitting device, and the second lens group. The second lens group is disposed between the light splitting device and the image sensor. The light sources are disposed around the image sensor and project a plurality of beams to the target area through the first lens group, the light splitting device, and the second lens group.

9 Claims, 8 Drawing Sheets

HEAD MOUNTED DISPLAY APPARATUS AND EYE-TRACKING APPARATUS THEREOF

BACKGROUND

Technical Field

The disclosure relates to a head mounted display apparatus and an eye-tracking apparatus thereof, and in particular, to a head mounted display apparatus and an eye-tracking apparatus thereof providing enhanced visual comfort.

Description of Related Art

Dizziness and visual discomfort are currently the major bottlenecks in the development of optical products such as augmented reality (AR) or virtual reality (VR) head mounted displays (HMDs) or smart eyewear and the like. At present, only a few commercially available AR and VR technologies may provide the most favorable design configuration or effective guidance targeting at specific users' head shapes, vision conditions, and wearing postures. Improper wearing may not only lead to physical discomfort for a user, but may also seriously affect the quality of received information and images (blurred image or unnatural image distortion) and the like when the user immerse him/herself in AR or VR. After experiencing AR/VR for the first time, a consumer may lose his/her interest in such technology as a result.

SUMMARY

Accordingly, the disclosure provides a head mounted display apparatus and an eye-tracking apparatus capable of effectively tracking an eye, such that dizziness and visual discomfort is alleviated, and visual comfort is thereby enhanced.

The disclosure provides an eye-tracking apparatus including a first lens group, a light splitting device, a display, an image sensor, a second lens group, and a plurality of light sources. The first lens group has a first surface facing a target area and a second surface opposite to the first surface. The light splitting device receives a first beam, generates a second beam, and transmits the second beam to the second surface of the first lens group. The display projects a reference mark to a target area. The image sensor captures a detection image on the target area through the first lens group, the light splitting device, and the second lens group. The second lens group is disposed between the light splitting device and the image sensor. The light sources are disposed around the image sensor and project a plurality of beams to the target area through the first lens group, the light splitting device, and the second lens group.

The disclosure further provides a head mounted display apparatus including a processor and the eye-tracking apparatus as described above. The processor is coupled to the image sensor and receives the detection image.

To sum up, in the head mounted display apparatus provided by the disclosure, the first lens group, the light splitting device, the image sensor, the second lens group, the light sources, and the detection image are disposed and arranged. A plurality of beams are projected to the target area after passing through the first lens group, the light splitting device, and the second lens group through the light sources disposed around the image sensor, the reference mark is projected to the target area by the display, and the detection image on the target area is captured through the first lens group, the light splitting device, and the second lens group by the image sensor. In this way, an eye may be effectively tracked, and that dizziness and visual discomfort is alleviated, and visual comfort is thereby enhanced.

To make the aforementioned more comprehensible, several embodiments accompanied with drawings are described in detail as follows.

DESCRIPTION OF THE EMBODIMENTS

Figure 1A:
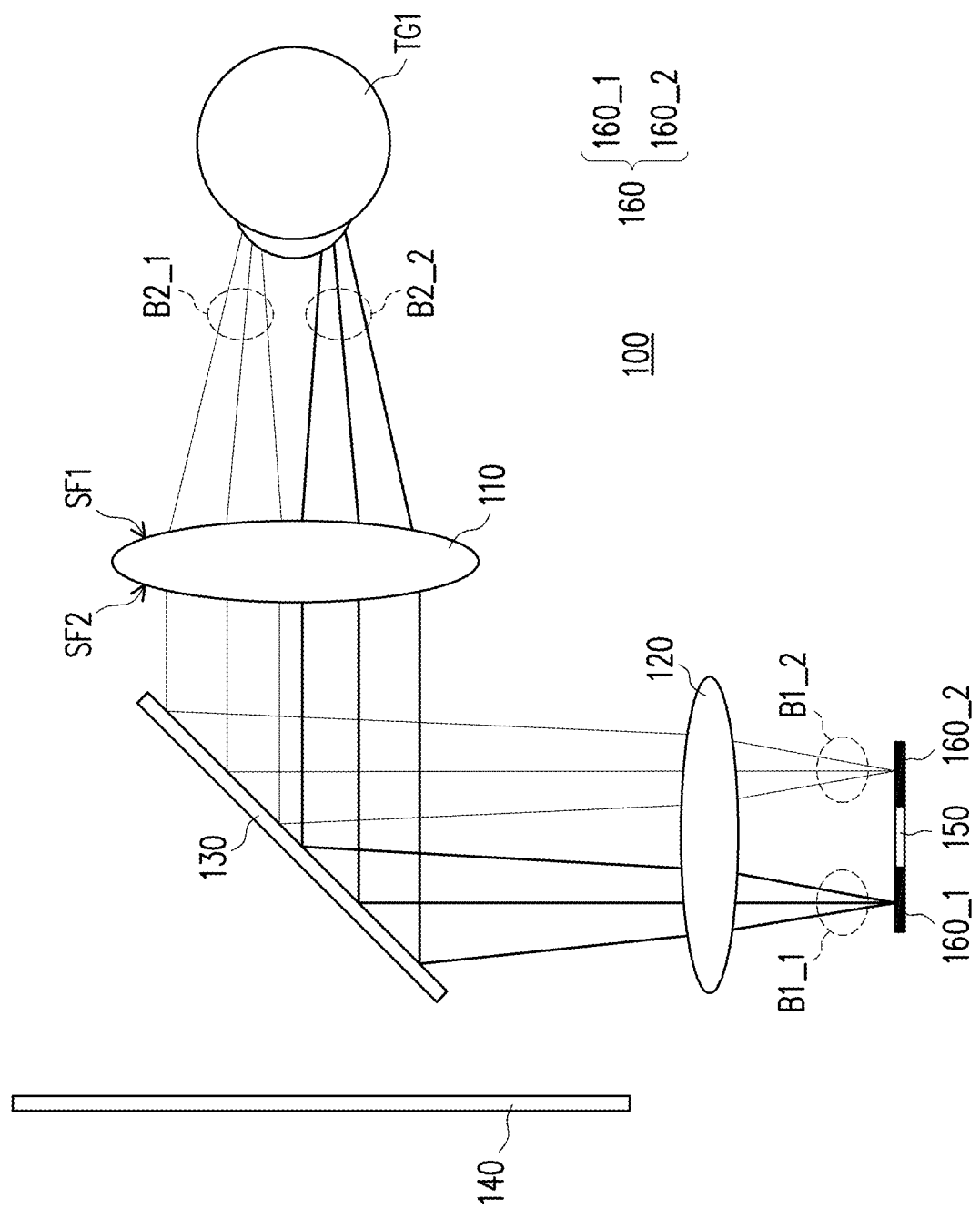
FIG. 1A and FIG. 1B are schematic diagrams illustrating an eye-tracking apparatus according to an embodiment of the disclosure.
Figure 1B:
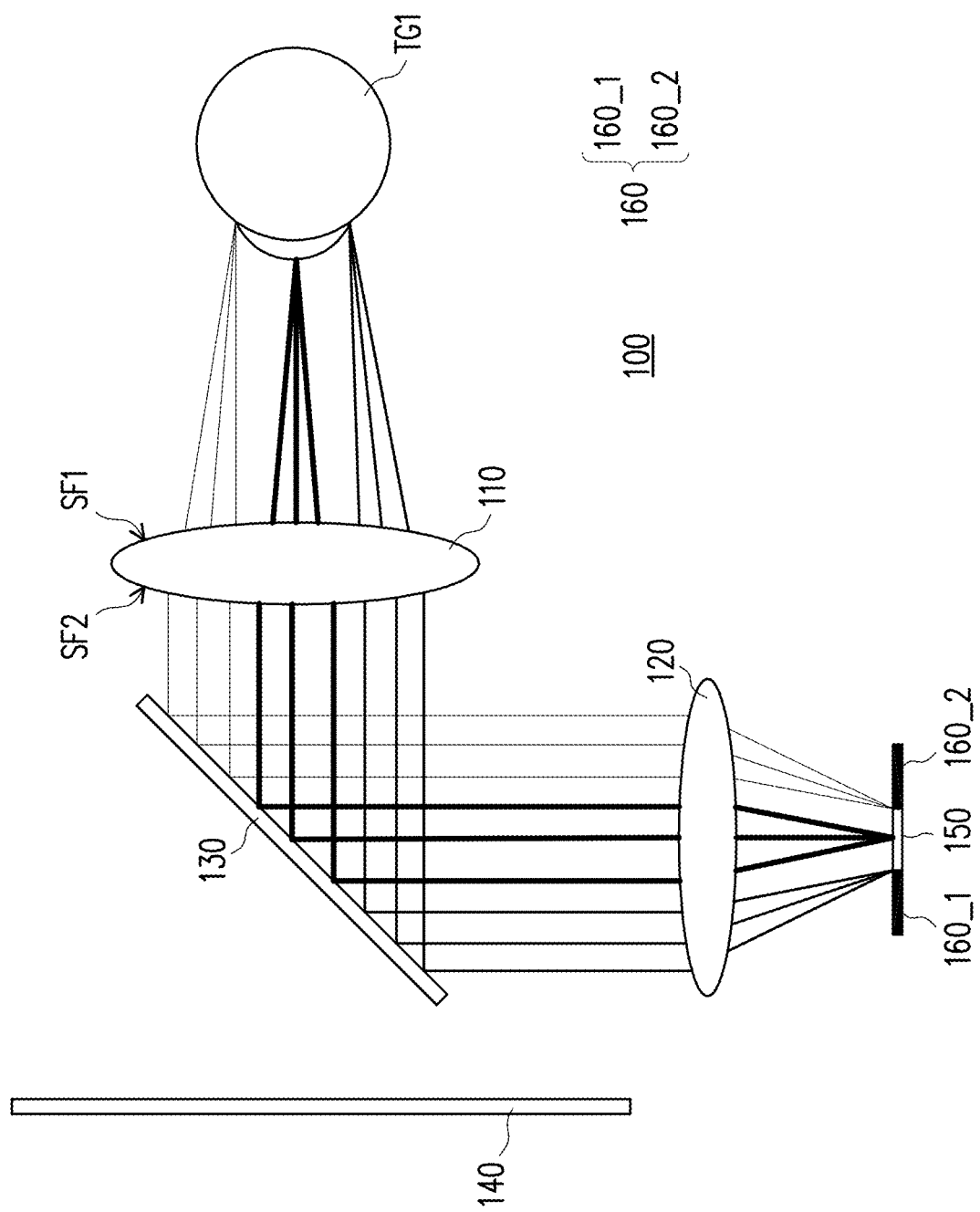

FIG. 1A and FIG. 1B are schematic diagrams illustrating an eye-tracking apparatus according to an embodiment of the disclosure. FIG. 1A and FIG. 1B have the same hardware architectures, and a difference therebetween lies in that a plurality of light paths of light source projection are depicted in FIG. 1A, and a light path for detection image capturing is depicted in FIG. 1B. In FIG. 1A, an eye-tracking apparatus 100 includes lens groups 110 and 120, a light splitting device 130, a display 140, and image sensor 150, and a light source 160. Herein, the lens group 110 has a first surface SF1 and a second surface SF2. The first surface SF1 of the lens group 110 faces a target area TG1. The second surface SF2 of the lens group 110 is opposite to the first surface SF1 of the lens group 110. The display 140 is configured to project a reference mark to the target area TG1 through the light splitting device 130 and the lens group 110. The lens group 120 is disposed between the light splitting device 130 and the image sensor 150. The light source 160 may be divided into two parts of light sources 160-1 and 160-2 disposed around the image sensor 150. The light sources 160-1 and 160-2 are configured to project beams B1-1 and B1-2.

Operation of the eye-tracking apparatus provided by the embodiment of FIG. 1A of the disclosure is provided in detail as follows. In FIG. 1A, the light sources 160_1 and 160_2 respectively project beams B1_1 and B1_2 to the lens group 120, and the beams pass through the lens group 120 and emit towards the light splitting device 130. The light splitting device 130 receives the beams B1_1 and B1_2 and generates beams B2_1 and B2_2. The light splitting device 130 transmits the beams B2_1 and B2_2 to the lens group 110, and the beams pass through the lens group 110 and are projected to the target area TG1. Herein, the light splitting device 130 is configured to reflect the beams B1_1 and B1_2 and generates the beams B2_1 and B2_2. The lens group 110 may be formed by one or a plurality of lenses, and formation of the lens group 110 is not particularly limited.

In this embodiment, the target area TG1 may be the position where a user's eye is located. The lens group 120 may be a zoom lens group. After passing through the lens group 120, the beams B1_1 and B1_2 generated by the light sources 160_1 and 160_2 may pass through the light splitting device 130, and the beams B2_1 and B2_2 generated by the light splitting device 110 pass through the lens group 110 and are distributed on the surface of the eye, such that a plurality of light spot images are formed around the pupil of the eye. The lens group 120 may be configured to focus a detection image on the surface of the eye on the image sensor 150.

With reference to FIG. 1B next, the image sensor 150 captures the detection image on the target area TG1 through the lens group 120, the light splitting device 130, and the lens group 110, such that the eye-tracking apparatus may perform eye tracking according to the detection image.

Further, each of the light source 160_1 and 160_2 may be formed by one or a plurality of light-emitting diodes. In this embodiment, the light-emitting diode may be an infrared light-emitting diode. The image sensor 150 may be an infrared sensor featuring an infrared ray receiving function. The light splitting device 130 may reflect infrared beams sent from the light sources 160_1 and 160_2. Regarding a material of the light splitting device 130, any light splitting device known to a person of ordinary skill in the art may be applied, and such material is not particularly limited in the embodiments of the disclosure.

In this embodiment, the eye-tracking apparatus 100 may also analyze light spot images including the corresponding beams B2_1 and B2_2 on the target area TG1 and a detection image of the reference mark projected by the display 140 and detects misalignment information of the eye of the user through a positional relationship between the plurality of images. Generally, such misalignment includes a misalignment caused by wearing, a so-called interpupillary distance (IPD) misalignment, or another kind of misalignment caused by strabismus. Further, the misalignment caused by wearing may be determined by a positional relationship between the eye of the user and the image sensor 150. In this embodiment, the image sensor 150 is disposed at a center of a plurality of the light sources 160, so that such determination may be made according to a positional relationship between a plurality of light spot images projected by the light sources 160 and the eye. The misalignment caused by strabismus is determined according to a viewing angle of the user. Moreover, a plurality of test images are projected according to a plurality of transmission angles through the display 140, and such determination is made according to the transmission angles and angle-of-view information of the user.

Regarding calculation of the misalignment information, detailed description is provided in the following embodiments.

Note that in the embodiments of the disclosure, since the light sources 160_1 and 160_2 are disposed around the image sensor 150, the light spot images generated by the light sources 160_1 and 160_2 in the detection image captured by the image sensor 150 may be evenly distributed around the pupil of the eye, and that accuracy of eye tracking is effectively enhanced. As such, in this way, a head mounted display apparatus applying the eye-tracking apparatus 100 provided by the disclosure may further detect whether a misalignment or strabismus occurs between the head mounted display apparatus and an eye of the user. By giving proper warning or guidance, the user may know how to adjust the head mounted display apparatus to a suitable stereo display position, and that problems such as dizziness and visual discomfort that a consumer may encounter when experiencing augmented reality or virtual reality may thus be significantly improved, and visual comfort is thereby enhanced.

Figure 2A:
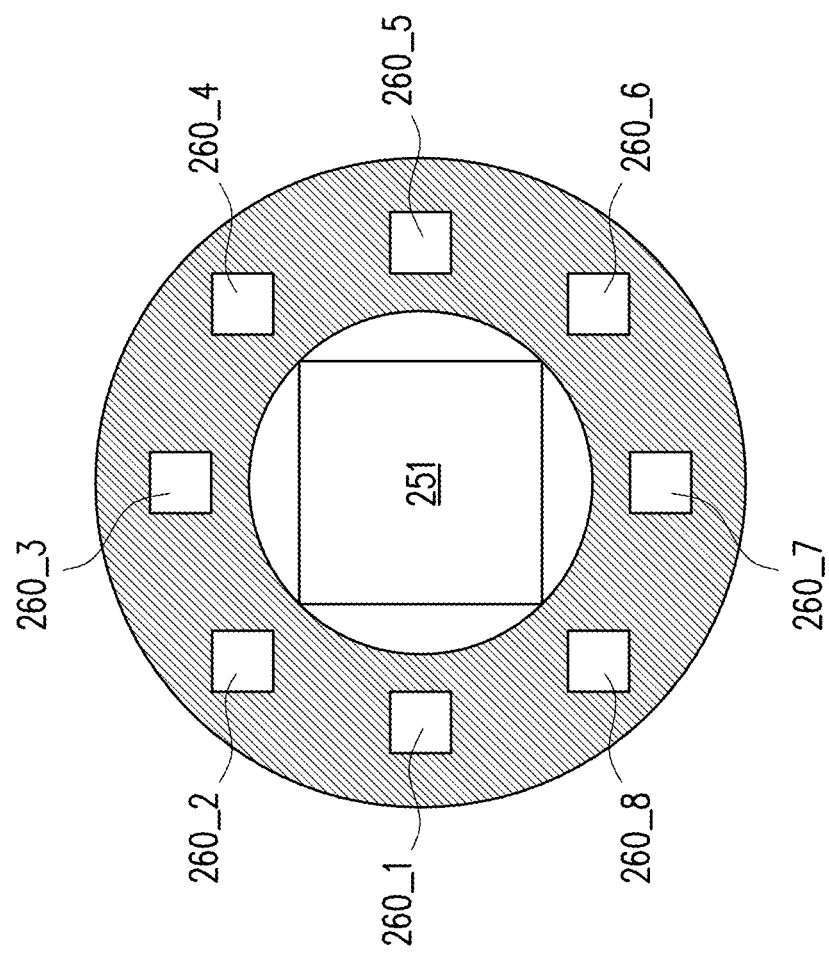
FIG. 2A and FIG. 2B are schematic diagrams each illustrating arrangement of a plurality of light sources and an image sensor according to different embodiments of the disclosure.
Figure 2B:
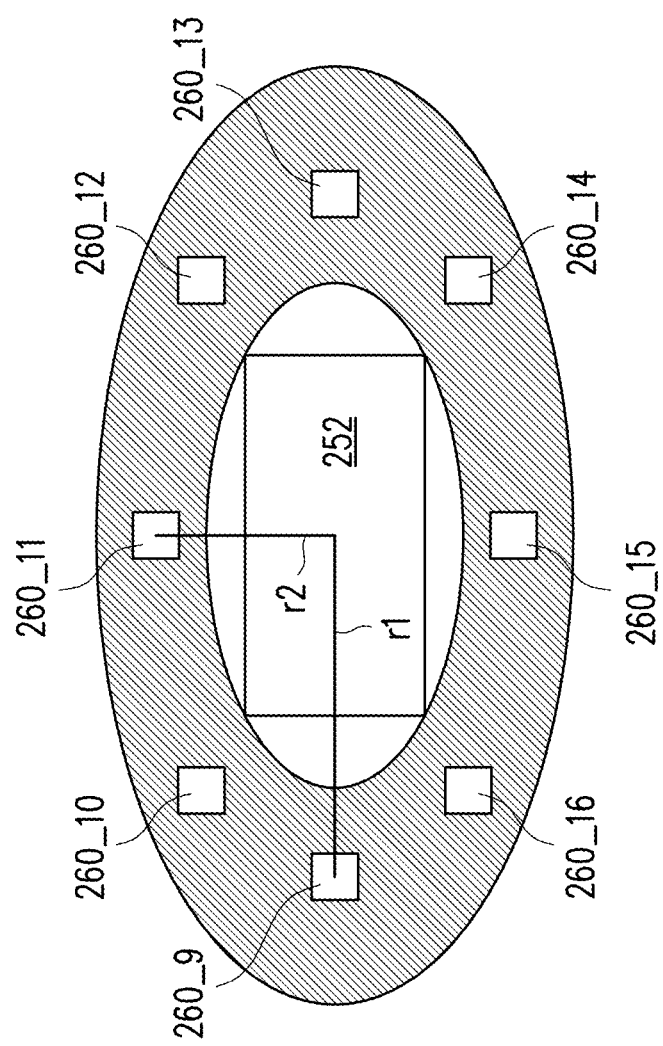

FIG. 2A and FIG. 2B are schematic diagrams each illustrating arrangement of a plurality of light sources and an image sensor according to different embodiments of the disclosure. In FIG. 2A, light sources 260_1 to 260_8 may be disposed around an image sensor 251, and a plurality of distances between the light sources 260_1 to 260_8 and the image sensor 251 may be identical. Certainly, a number of the light sources 260_1 to 260_8 in FIG. 2A is merely an example for description and is not intended to limit the scope of the disclosure. In other embodiments of the disclosure, the number of the light sources may at least be three.

In another embodiment of FIG. 2B, light sources 260_9 to 260_16 may be disposed around an image sensor 252. Further, a plurality of distances between the light sources 260_9 to 260_16 and the image sensor 252 are provided, and the distances between at least two light sources and the image sensor 252 are not identical. For instance, a distance r1 is provided between the light source 260_9 and the image sensor 252, another distance r2 is provided between the light source 260_11 and the image sensor 252, and the distance r1 is not equal to the distance r2 (r1>r2). Incidentally, when the longer distance r1 is provided between the light source 260_9 and the image sensor 252 and the shorter distance r2 is provided between the light source 260_11 and the image sensor 252, power of the light source 260_9 may be greater than power of the light source 260_11. Certainly, a number of the light sources 260_9 to 260_16 in FIG. 2B is merely an example for description and is not intended to limit the scope of the disclosure.

Incidentally, in other embodiments of the disclosure, the light source are not necessarily required to be arranged around the image sensor in a ring shape. The light sources may be arranged around the image sensor in other shapes.

Figure 3:
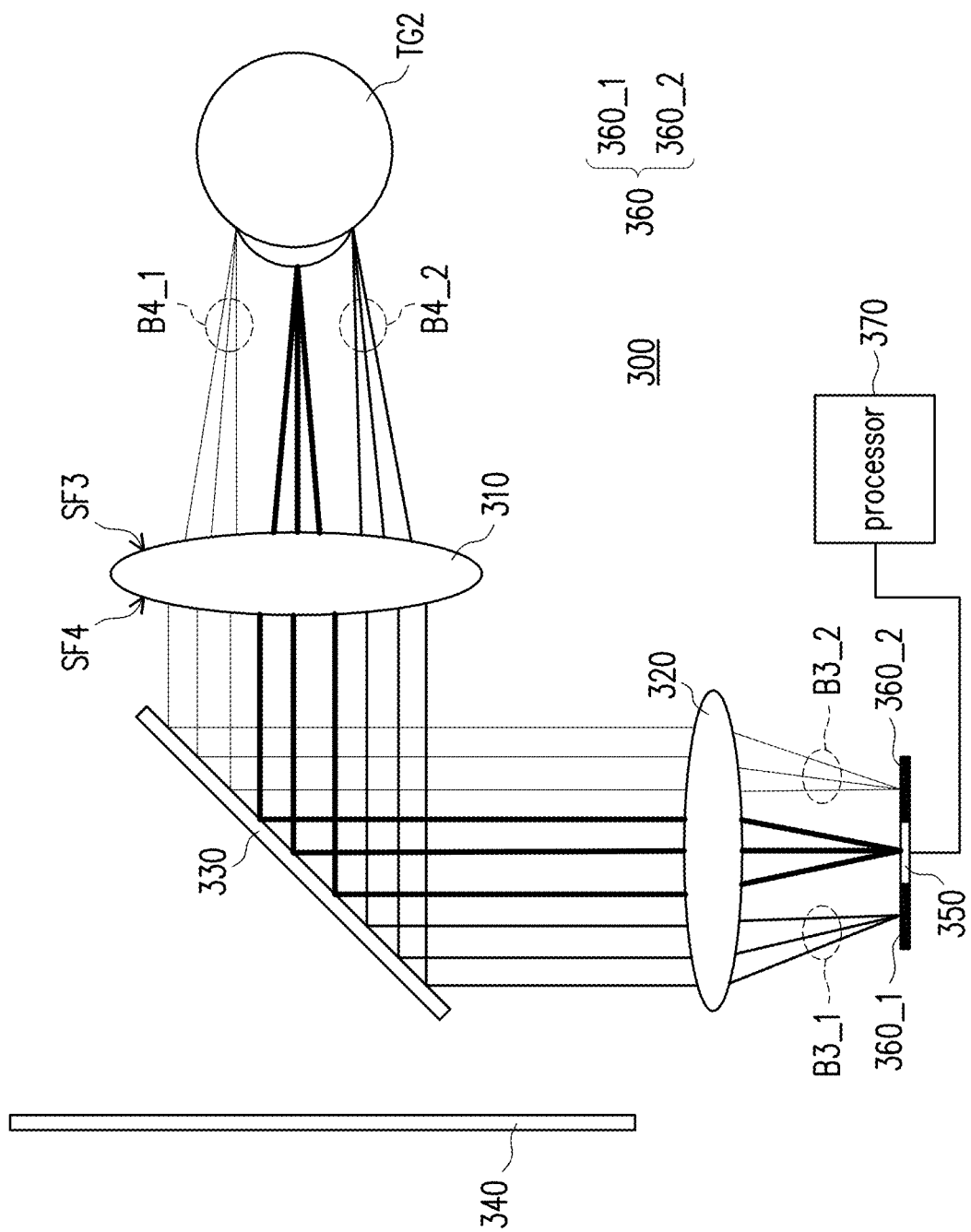
FIG. 3 is a schematic diagram illustrating a head mounted display apparatus according to an embodiment of the disclosure.

FIG. 3 is a schematic diagram illustrating a head mounted display apparatus according to an embodiment of the disclosure. In this embodiment, a head mounted display apparatus 300 includes lens groups 310 and 320, a light splitting device 330, a display 340, an image sensor 350, a light source 360, and a processor 370. Different from the embodiments of FIG. 1A and FIG. 1B, the processor 370 is additionally disposed in this embodiment and is configured to execute operations related to eye tracking and eye misalignment verification.

The processor 370 may be a processor featuring a calculation capability. Alternatively, the processor 370 may be designed through hardware description language (HDL) or any other digital circuit design well known to a person of ordinary skill in the art and may be a hardware circuit implemented through a field programmable gate array (FPGA), a complex programmable logic device (CPLD), or an application-specific integrated circuit (ASIC).

Figure 4:
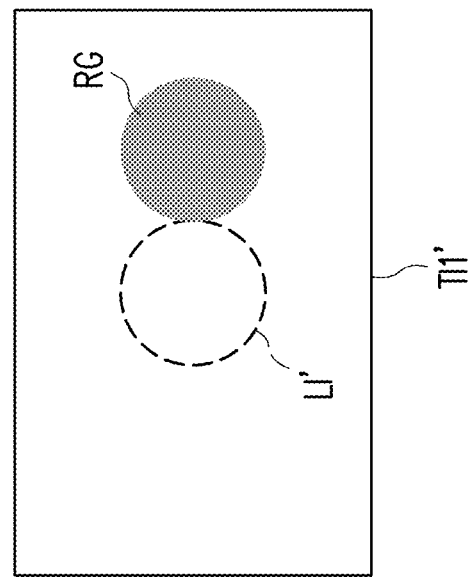
FIG. 4 is a schematic diagram illustrating a misalignment verification operation of different implementation according to the embodiments of the disclosure.
Figure 4:
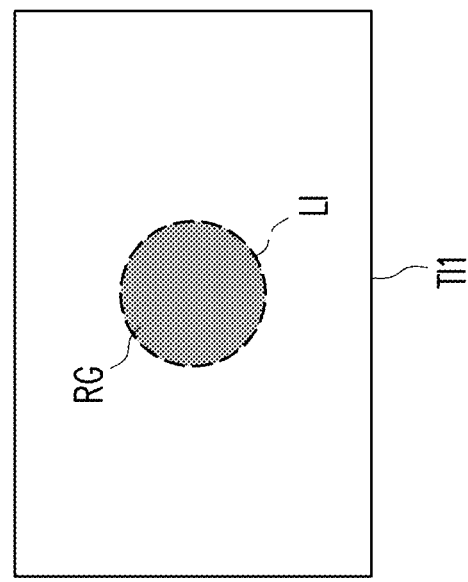

FIG. 4 is a schematic diagram illustrating a misalignment verification operation of different implementation according to the embodiments of the disclosure. With reference to FIG. 3 and FIG. 4, the head mounted display apparatus 300 may perform a wearing misalignment verification mode through the processor 370. In a detection image TI1 in FIG. 4, a plurality of light spot images LI projected by the light source 360 overlap a predetermined reference range RG on a corresponding target area TG2 in the detection image TI1, meaning that a wearing misalignment does not occur in the head mounted display apparatus 300.

In contrast, in a detection image TI1', a plurality of light spot images LI' projected by the light source 360 do not overlap the predetermined reference range RG on the corresponding target area TG2 in the detection image TI1', meaning that a wearing misalignment occurs in the head mounted display apparatus 300.

On the other hand, the head mounted display apparatus 300 may determine the misalignment information according to a positional relationship between the light spot images LI or LI' and the predetermined reference range RG through the processor 370 and feeds back the misalignment information to the user to guide the user to correctly adjust the left and right pupil distances of the left and right eyes and to correctly present a wearing posture.

In another embodiment of the disclosure, the processor 370 may first determine whether an image of a reference mark projected by the display 340 to the target area TG2 is located in the predetermined reference range R on the target area TG2 for a predetermined time before determining the misalignment information next, that is, focusing is performed in advance. For instance, in this embodiment, the target area TG2 may be the position where the user's eye is located, and the display 340 may project one mark (e.g., a star totem or a mark of any shapes) to the eye of the user for the user to perform focusing. At the same time, the user may look directly at the mark for a predetermined time (e.g., 1 to 2 seconds), the user's eye movement is thereby stabilized, and the eye is kept to be as still as possible. Herein, small-scale eye vibration may be eliminated by subsequent image processing by the processor 370, such that accurate determination is provided by the misalignment verification mode of this embodiment. Certainly, the predetermined time of 1 to 2 seconds is merely an example for description and is not intended to limit the scope of the disclosure.

Figure 5:
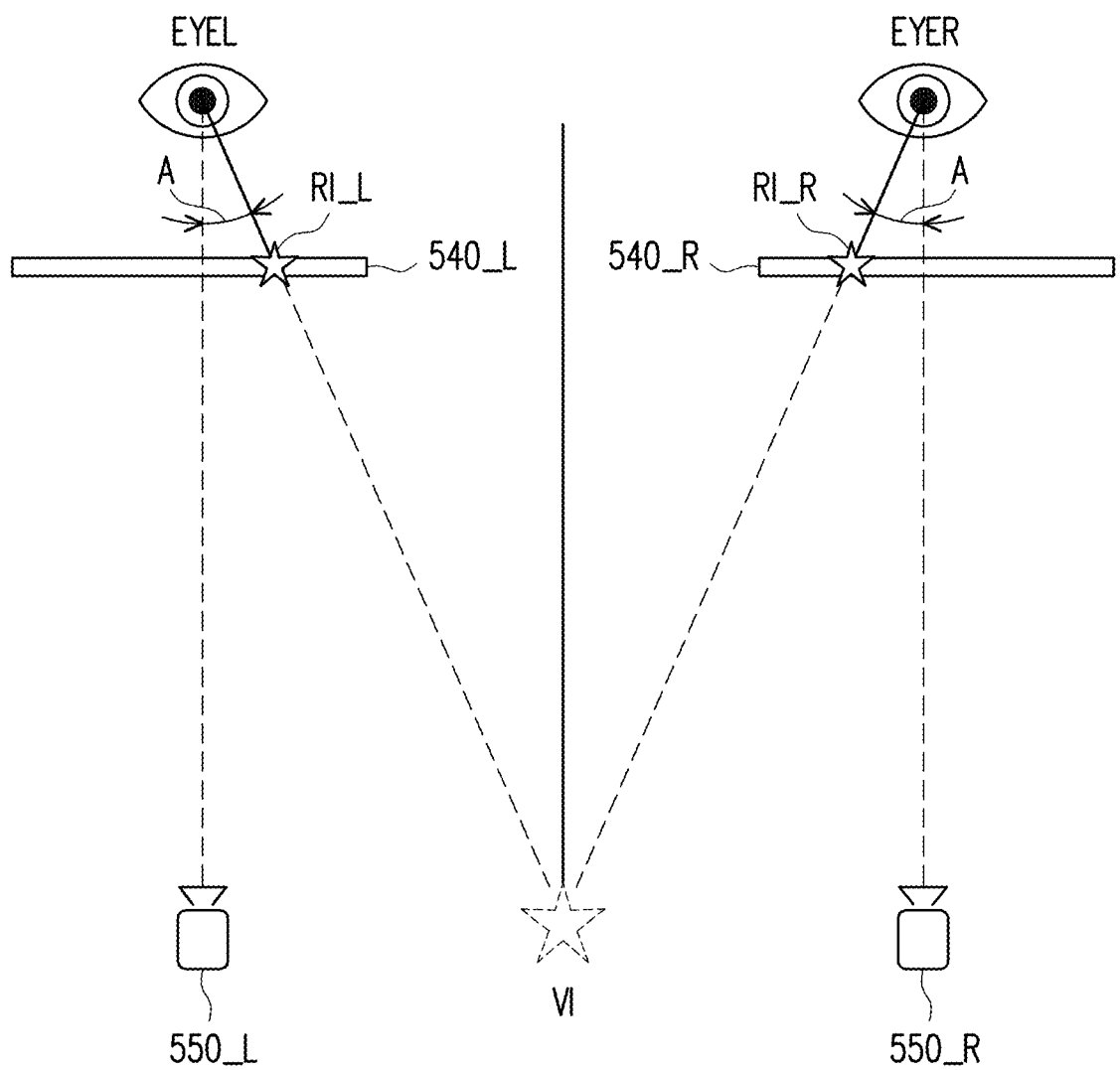
FIG. 5 is a schematic diagram illustrating a misalignment verification operation according to an embodiment of the disclosure.
Figure 6:
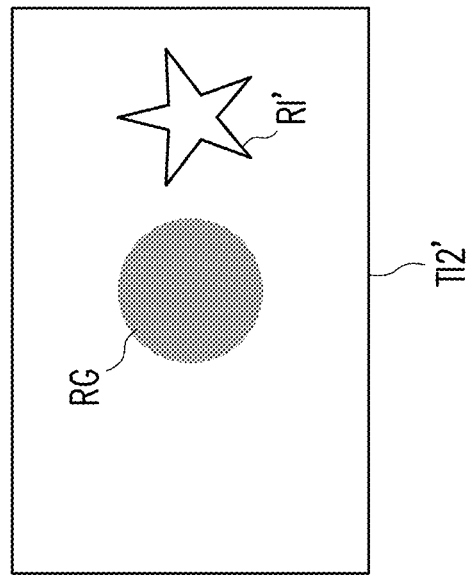
FIG. 6 is a schematic diagram illustrating a misalignment verification operation of different implementation according to the embodiments of the disclosure.
Figure 6:
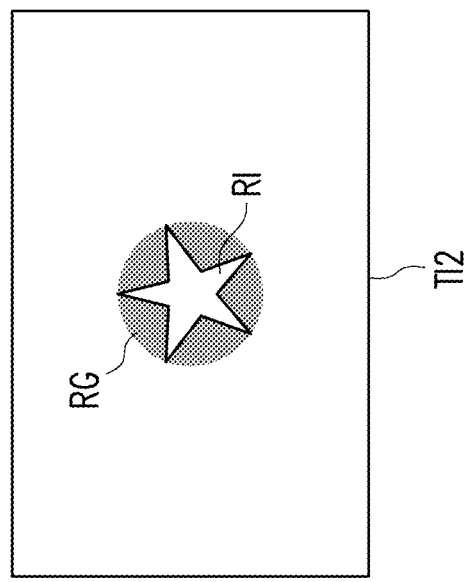

FIG. 5 is a schematic diagram illustrating a misalignment verification operation according to an embodiment of the disclosure, and FIG. 6 is a schematic diagram illustrating a misalignment verification operation of different implementation according to the embodiments of the disclosure. With reference to FIG. 5 and FIG. 6, the processor in the head mounted display apparatus provided by this embodiment may perform a strabismus misalignment verification mode after performing the wearing misalignment verification mode of FIG. 4. In FIG. 5, displays 540_L and 540_R and image sensors 550_L and 550_R corresponding to left and right eyes EYEL and EYER respectively are depicted. The displays 540_L and 540_R may project two reference marks RI_L and RI_R (e.g., star totems or marks of any shapes) to the two eyes EYEL and EYER respectively according to a transmission angle A at the same time (or in time sharing). The eyes EYEL and EYER look at the reference marks RI_L and RI_R respectively to form light paths of a virtual image VI of the reference marks. The image sensors 550_L and 550_R may capture detection images on the eyes EYEL and EYER at the same time (or in time-sharing). The transmission angle A may be 0 degrees or a plurality of angles increasing in sequence (10 degrees→20 degrees . . . etc.) for repeated testing (of a plurality of test images) and recording.

If the user has a strabismus misalignment problem, the user's eye may turn to an angle not equal to the angle of the transmission angle A. The head mounted display apparatus may then obtain the angle-of-view information of the user through providing alternate displays of two eyes for one eye display through the displays 540_L and 540_R and through analysis of the detection images of the eyes EYEL and EYER through the processor, determines whether the eyes EYEL and EYER move according to the angle-of-view information and the transmission angle A, and thus to confirm whether the user has an strabismus alignment problem, and in this way, accurate determination is provided through the misalignment verification mode provided by this embodiment.

FIG. 6 is a schematic diagram illustrating a misalignment verification operation of different implementation according to the embodiments of the disclosure. In a detection image TI2 in FIG. 6, an image RI of the reference mark overlaps the predetermined reference range RG on the target area in the detection image TI2, meaning that the user of the head mounted display apparatus does not have the strabismus misalignment problem.

In contrast, in a detection image TI2', an image RI' of the reference mark does not overlap the predetermined reference range RG on the target area in the detection image TI2', meaning that the user of the head mounted display apparatus has a strabismus misalignment problem.

On the other hand, the head mounted display apparatus may determine a strabismus level according to a positional relationship between the image RI or RI' of the reference mark and the predetermined reference range RG through the processor and feeds back the strabismus level to the user.

In view of the foregoing, in the embodiments of the disclosure, since the light sources are disposed around the image sensor, the light spot images generated by the light sources in the detection image captured by the image sensor may be evenly distributed around the pupil of the eye, and that accuracy of eye tracking is effectively enhanced. As such, in this way, in the head mounted display apparatus applying the eye-tracking apparatus provided by the disclosure, the wearing misalignment verification mode and the strabismus misalignment verification mode may be performed through the processor. Therefore, the head mounted display apparatus is detected whether to be properly worn, the IPD position of the left and right eyes is detected whether to be correctly adjusted, and moreover, the user may be guided to adjust wearing of the head mounted display apparatus. Furthermore, the head mounted display apparatus may detect whether the user has strabismus, and medical resources may be further combined in the future to provide assistance, or display content may be further adjusted. By giving proper warning or guidance, the user may know how to adjust the head mounted display apparatus to a suitable stereo display position, and that problems such as dizziness and visual discomfort that a consumer may encounter when experiencing augmented reality or virtual reality may thus be significantly improved, and visual comfort is thereby enhanced.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:
1. An eye-tracking apparatus, comprising:
  a first lens group, comprising a first surface facing a target area and a second surface opposite to the first surface;
  a light splitting device, receiving a first beam, generating a second beam, transmitting the second beam to the second surface of the first lens group;

a display, projecting a reference mark to the target area through the light splitting device and the first lens group;

an image sensor, capturing a detection image on the target area through the first lens group, the light splitting device, and a second lens group, wherein the second lens group is disposed between the light splitting device and the image sensor;

a plurality of light sources, disposed around the image sensor, projecting a plurality of beams to the target area through the first lens group, the light splitting device, and the second lens group;

a processor configured to receive the detection image and analyze an image of the reference mark in the detection image and a positional relationship between a plurality of light spot images corresponding to the beams and a predetermined reference range on the target area to determine misalignment information.

2. The eye-tracking apparatus according to claim 1, wherein a number of the light sources is at least three, and distances between the light sources and the image sensor are identical.

3. The eye-tracking apparatus according to claim 1, wherein a plurality of distances are provided between the light sources and the image sensor, wherein at least two of the distances are different.

4. The eye-tracking apparatus according to claim 3, wherein when a first distance is greater than a second distance, power of a first light source corresponding to the first distance is greater than power of a second light source corresponding to the second distance.

5. The eye tracking apparatus as claimed in claim 1, wherein the processor is coupled to the image sensor and configured to perform eye tracking.

6. A head mounted display apparatus, comprising:
an eye-tracking apparatus, comprising:
   a first lens group, comprising a first surface facing a target area and a second surface opposite to the first surface;
   a light splitting device, receiving a first beam, generating a second beam, transmitting the second beam to the second surface of the first lens group;
   a display, projecting a reference mark to the target area through the light splitting device and the first lens group; and
   an image sensor, capturing a detection image on the target area through the first lens group, the light splitting in device, and the second lens group, wherein the second lens group is disposed between the light splitting device and the image sensor;
   a plurality of light sources, disposed around the image sensor, projecting a plurality of beams to the target area through the first lens group, the light splitting device, and the second lens group; and
   a processor, coupled to the image sensor, receiving the detection image,
   wherein in a first misalignment verification mode, the processor is configured to:
   analyze an image of the reference mark in the detection image and a plurality of light spot images, wherein the light spot images correspond to the beams, and
   determine misalignment information according to a positional relationship between the light spot images and a predetermined reference range on the target area.

7. The head mounted display apparatus according to claim 6, wherein the processor is further configured to:
   first determine the time the image of the reference mark is located in the reference range for a predetermined time and then determine the misalignment information according to the positional relationship between the light spot images and the reference range.

8. The head mounted display apparatus according to claim 6, wherein a second misalignment verification mode is performed after the first misalignment verification mode, wherein the processor is further configured to:
   determine a strabismus level according to a positional relationship between the image of the reference mark and the reference range.

9. The head mounted display apparatus according to claim 8, wherein
   the processor determining the strabismus level according to the positional relationship between the image of the reference mark and the reference range comprises:
   the display is configured to project a plurality of test images to the target area in sequence according to a plurality of transmission angles, and
   the processor analyzes the detection image to obtain angle-of-view information of a user and determines a strabismus level of the user according to the angle-of-view information and each of the transmission angles.

* * * * *